(12) United States Patent
Feng et al.

(10) Patent No.: US 11,009,447 B2
(45) Date of Patent: May 18, 2021

(54) MICRO AIRFLOW GENERATOR FOR MINIATURE PARTICULATE MATTER SENSOR MODULE

(71) Applicant: Honeywell International Inc., Morris Plains, NJ (US)

(72) Inventors: Chen Feng, Snohomish, WA (US); Tao Chen, Shanghai (CN); Jennifer Liu, Shanghai (CN); Tong Shang, Denville, NJ (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 16/208,842

(22) Filed: Dec. 4, 2018

(65) Prior Publication Data
US 2019/0178783 A1 Jun. 13, 2019

Related U.S. Application Data

(60) Provisional application No. 62/597,183, filed on Dec. 11, 2017.

(51) Int. Cl.
*G01N 15/14* (2006.01)
*F04B 43/02* (2006.01)
(Continued)

(52) U.S. Cl.
CPC ......... *G01N 15/1484* (2013.01); *F04B 43/02* (2013.01); *G01N 15/06* (2013.01);
(Continued)

(58) Field of Classification Search
CPC .............. G01N 15/1484; G01N 15/06; G01N 15/1404; G01N 15/1459;
(Continued)

(56) References Cited

U.S. PATENT DOCUMENTS 1,943,234 A * 1/1934 Carter .................... F23C 99/00
261/28
6,227,809 B1 5/2001 Forster et al.
(Continued)

*Primary Examiner* — Isiaka O Akanbi
(74) *Attorney, Agent, or Firm* — Alston & Bird LLP

(57) ABSTRACT

Disclosed embodiments may relate generally to a micro airflow generator which does not use fan(s) or a heater to generate airflow (for example in a compact optical PM sensor). Rather, disclosed embodiments typically may use induced movement of a membrane/diaphragm element to generate air flow (wherein movement of the membrane in turn induces movement in air). For example, a membrane or diaphragm element could be driven by an (electronic) actuator element, such as an electro-magnetic actuator or piezo disc bender (or some other means of vibrating/moving the membrane element in a way which induced airflow). In some embodiments, the electro-magnetic actuator itself may include a membrane (such that the electro-magnetic actuator might encompass the membrane and the electronic actuator element, such as a magnet and corresponding coil) and/or the piezo disc bender might serve as both the membrane/diaphragm and the electronic actuator element.

10 Claims, 8 Drawing Sheets

(51) Int. Cl.
    *G01N 15/06*      (2006.01)
    *G01N 15/00*      (2006.01)
(52) U.S. Cl.
    CPC ..... *G01N 15/1404* (2013.01); *G01N 15/1459*
        (2013.01); *G01N 2015/0046* (2013.01); *G01N
        2015/0693* (2013.01); *G01N 2015/1486*
        (2013.01)
(58) Field of Classification Search
    CPC ... G01N 2015/0046; G01N 2015/0693; G01N
        2015/1486; F04B 43/02; F04B 43/043;
        F04B 43/046
    USPC .................................................. 356/336–338
    See application file for complete search history.

(56)         References Cited

U.S. PATENT DOCUMENTS 6,967,338 B1 *   11/2005  Sickenberger ..... G01N 15/1459
                                                    250/461.1
    8,608,700 B2    12/2013  Rubel
    10,221,747 B2 *  3/2019  Suchezky ............... F01N 13/10
    2001/0035150 A1 * 11/2001 Daly ...................... F02M 35/08
                                                    123/198 E
    2004/0202558 A1 * 10/2004 Fong .................... F04B 43/046
                                                    417/413.2
    2005/0173563 A1 *  8/2005 Coldren ............. F02M 63/0068
                                                    239/533.1
    2007/0205853 A1 *  9/2007 Taya ..................... H01F 1/0308
                                                    335/205
    2008/0304979 A1 * 12/2008 Lucas .................... F04B 45/04
                                                    417/327
    2009/0148320 A1 *  6/2009 Lucas .................. F04B 43/046
                                                    417/481
    2015/0260181 A1 *  9/2015 Harvey ................ F04B 45/043
                                                    417/410.1
    2016/0231274 A1 *  8/2016 Tirapu Azpiroz ..........................
                                                    G01N 27/44713
    2017/0265691 A1 *  9/2017 Ophardt .................. F04B 15/00
    2018/0217044 A1 *  8/2018 Yang ..................... G01N 15/06

* cited by examiner

MICRO AIRFLOW GENERATOR FOR MINIATURE PARTICULATE MATTER SENSOR MODULE

CROSS-REFERENCE TO RELATED APPLICATIONS

The present application claims priority to U.S. Provisional Patent Application Ser. No. 62/597,183 filed Dec. 11, 2017 by Chen Feng, et al. and entitled "Micro Airflow Generator for Miniature PM Sensor Module" which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Compact/miniature optical particulate matter (PM) sensors typically use a fan to generate airflow for optical scattering particle detection. However, such a fan is bulky, noisy, unreliable, and has a limited lifespan. A heater has also been used as an alternative to the fan to generate airflow. A heater, however, has a lower efficiency and lower flow rate, while also having a higher power consumption. And while a conventional pump may be used with large optical PM sensors (e.g. sized at least 10-times larger than compact optical PM sensors) to generate reliable airflow, such pumps tend to be too big and power hungry to work effectively in the context of a compact optical PM sensor. Thus, there is a need for a new means of generating air flow for a compact optical PM sensor, e.g. for optical scattering particle detection.

SUMMARY

In some embodiments, a micro airflow generator may comprise a pump housing; a diffusion channel incorporated into the pump housing; a valvular conduit incorporated into the pump housing and in fluid communication with the diffusion channel; a pump plate configured to fit within the pump housing, and comprising an aperture in fluid communication with the valvular conduit; an actuator positioned adjacent to the pump plate within the pump housing; and a steel cover plate configured to attach to the pump housing and contain the elements within the pump housing.

In some embodiments, a method for generating airflow via a micro airflow generator within a compact optical scattering particulate matter sensor may comprise providing a micro airflow generator comprising a housing having at least one inlet and at least one outlet; a membrane configured so that movement of the membrane drives air through the outlet; and an actuator configured to drive membrane movement; generating airflow out of the housing via the actuator; directing the airflow into an optical scattering particle detection module; and detecting, by the optical scattering particle detection module, particulate matter within the airflow.

In some embodiments, a compact optical scattering particulate matter sensor comprising a micro airflow generator comprising a housing having an inlet and an outlet; a membrane configured so that movement of the membrane drives air through the outlet; and an actuator configured to drive membrane movement; and an optical scattering particle detection module, wherein the outlet of the micro airflow generator is configured to direct airflow for interaction with the optical scattering particle detection module.

DETAILED DESCRIPTION

Figure 1:
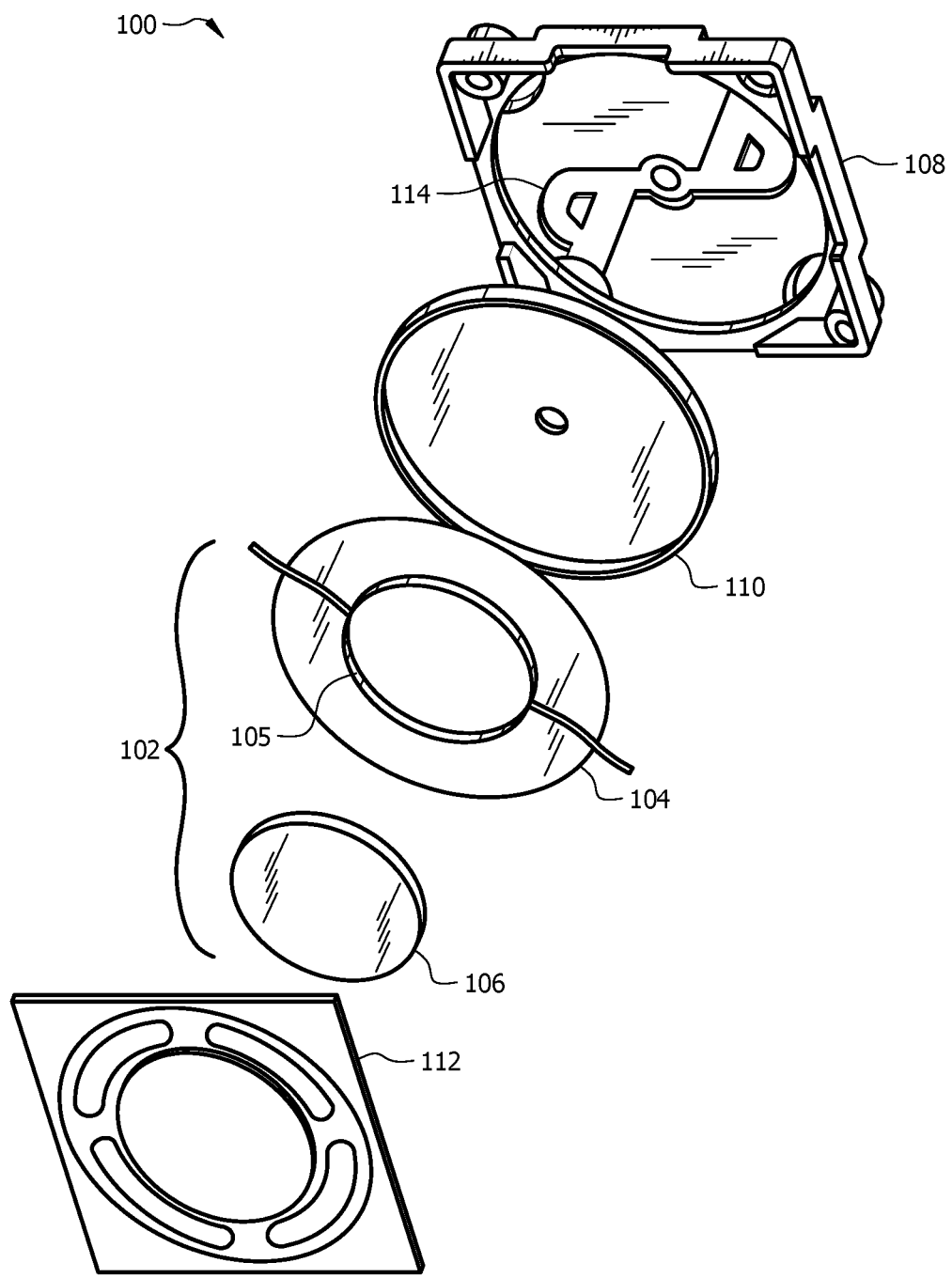
FIG. 1 illustrates an exploded view of an exemplary micro airflow generator comprising an electro-magnetic actuator, according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The following brief definition of terms shall apply throughout the application:

The term "comprising" means including but not limited to, and should be interpreted in the manner it is typically used in the patent context;

The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as "exemplary" or an "example," it should be understood that refers to a non-exclusive example;

The terms "about" or "approximately" or the like, when used with a number, may mean that specific number, or alternatively, a range in proximity to the specific number, as understood by persons of skill in the art field (for example +/−10%); and If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

Disclosed embodiments may relate generally to a micro airflow generator which does not use fan(s) or a heater to generate airflow (for example in a compact optical PM sensor). Rather, disclosed embodiments typically may use induced movement of a membrane/diaphragm element to generate air flow (wherein movement of the membrane in turn induces movement in air). For example, a membrane or diaphragm element could be driven by an (electronic) actuator element, such as an electro-magnetic actuator or piezo disc bender (or some other means of vibrating/moving the membrane element in a way which induced airflow). In some embodiments, the electro-magnetic actuator itself may include a membrane (such that the electro-magnetic actuator might encompass the membrane and the electronic actuator element, such as a magnet and corresponding coil) and/or the piezo disc bender might serve as both the membrane/diaphragm and the electronic actuator element. In some embodiments, such a micro airflow generator could be termed a micro membrane pump or micro pump, and any such micro pump might be used to achieve the desired air flow. Typically, a micro pump might comprise a pump diaphragm (such as a membrane element) and an actuator/driver (e.g. a means to induce movement of the corresponding membrane) which is configured to induce movement of the membrane element. Typically, a micro airflow generator for use with a compact optical PM sensor might provide outlet airflow flow rate in a range of 0.1 to 1 L/min. And typically, the power consumption for such a micro airflow generator might be 200 mW or less (for example a range of 100 to 200 mW) and/or the maximum noise generated by the micro airflow generator might be 20 dB or less (e.g. a range of 10 to 20 dB). And to work effectively for a compact optical PM sensor, such micro airflow generator would typically be sized with a footprint of 100 $mm^2$ or less and/or a volume of 250 $mm^3$ or less.

So, some embodiments of the disclosure may include a micro airflow generator where air flow is generated by an electro-magnetic actuator (which for example might drive a corresponding membrane in some embodiments). In some such embodiments, the electro-magnetic actuator can be constructed of miniature vinyl speaker parts or other similar material. In one embodiment, the electro-magnetic actuator can also operate as a pump diaphragm (e.g. as the pump diaphragm/membrane as well as the actuator/driver for inducing movement). The micro airflow generator with an electro-magnetic actuator may have a diameter of 10 mm and a thickness of 2.5 mm in some embodiments.

Alternatively, embodiments of the disclosure might include a micro airflow generator where air flow is generated by way of a piezo disc bender actuator (e.g. which might drive a corresponding membrane in some embodiments). The piezo disc bender actuator can be made of piezo buzzer disc bender parts or similar material. In an embodiment, the piezo disc bender actuator can also operate as a pump diaphragm (e.g. serving as the pump diaphragm/membrane as well as the actuator/driver). The micro airflow generator with a piezo actuator may have a diameter of 10 mm and a thickness of 2.5 mm in some embodiments.

Some disclosed embodiments may include a micro airflow generator with fixed passive dynamic check valves that are implemented on the inlet and outlet ports. The size of the airflow generator can therefore be reduced, and the structure can be simplified. The overall reliability of the airflow generator can therefore be improved compared to existing pumps.

Some embodiments of the disclosure may include the use of ultrasonic frequency waves to prevent audible noise and to prevent dust accumulation during the operation of the micro airflow generator. For example, the membrane/diaphragm element might be driven by the actuator/driver at a rate corresponding to ultrasonic frequency. The micro airflow generator may include injection molded pump housing, and in some embodiments, the pump housing may include one or more Tesla valvular conduits as an inlet check valve and/or a diffusion channel as an outlet check valve. In some embodiments, the micro airflow generator might include a Venturi in the neck of a pipe at an outlet to provide low pressure to drawing from the inlet. And in some embodiments, the micro airflow generator may include a pump plate in the pump housing to form the diffusion channel, the one or more valvular conduits and the Venturi.

In practice, such micro airflow generator embodiments could be used to generate airflow within a compact optical PM sensor. Embodiments typically are sized to be approximately 100 $mm^2$ or less in footprint, 250 $mm^3$ in volume, and/or 10 mm or less in diameter, such that they can fit within a compact optical PM sensor (which typically might be sized at less than 500 $mm^3$). In typical disclosed embodiments of the compact optical PM sensor, the micro airflow generator would be located/positioned/oriented/configured to generate air flow of a sample air stream (e.g. from an external environment to be tested) for optical scattering particle detection. Thus, the micro airflow generator might draw or drive (sample) air flow through an optical scattering PM detector unit (e.g. through a light beam and/or between a light source and a light detector used for optical scattering particle detection).

Micro airflow generator embodiments are disclosed in operation with a compact optical PM sensor that uses a simplified laser light source with a very short detecting distance. Disclosed embodiments describe a light source with a very small laser beam size (e.g. 2 µm at nominal wavelength 650 nm) comprising a direct diode laser beam that typically does not use any optical component, such as an optical window and/or focusing optics. The laser diode die may have a well-defined output beam profile at the near field close to the diode output area. The original diode laser beam typically is used without optically reshaping the beam profile. Disclosed embodiments further describe a photodiode to collect scattered laser light that is typically used without any collecting optics. In some embodiments, the short collecting distance means the photodiode may be highly efficient at collecting the scattered laser light. The high efficiency ensures that sufficient particulate matter should be detected and counted for the sensor to operate properly, even at this small size and without the use of focusing optics. In other embodiments, a light trap may be present to collect stray scattered light and minimize stray light into the detection area, as well as a laser heat sink that can provide thermal management for the laser diode die.

FIG. 1 shows an exploded view of an exemplary micro airflow generator 100 using an electro-magnetic actuator 102. The electro-magnetic actuator 102 in FIG. 1 may comprise a membrane 104 with a coil 105 and a magnet 106 (which can serve as the actuator/driver element driving the membrane 104). In some embodiments, the electro-magnetic actuator 102 can be constructed from miniature vinyl speaker parts or other similar material. The electro-magnetic actuator 102 typically is enclosed in a (pump) housing 108 (which typically has an outlet) between (pump) plate 110 and (steel) cover plate 112. In FIG. 1, the pump plate 110 has an aperture that aligns (e.g. along the longitudinal axis) with the outlet of the pump housing 108, and pump housing 108 contains a Tesla valvular conduit 114 in fluid communication with the inlet(s) and the outlet (and typically the aperture in the pump plate 110). The aperture in the pump plate 110 typically is sized approximately 0.3 mm$^2$ in FIG. 1 (for example in a range from 0.2 to 0.5 mm$^2$) and/or is sized to be 0.7 mm$^2$ in relation to the proximal (inner) opening of the outlet/diffusion channel).

Figure 2A:
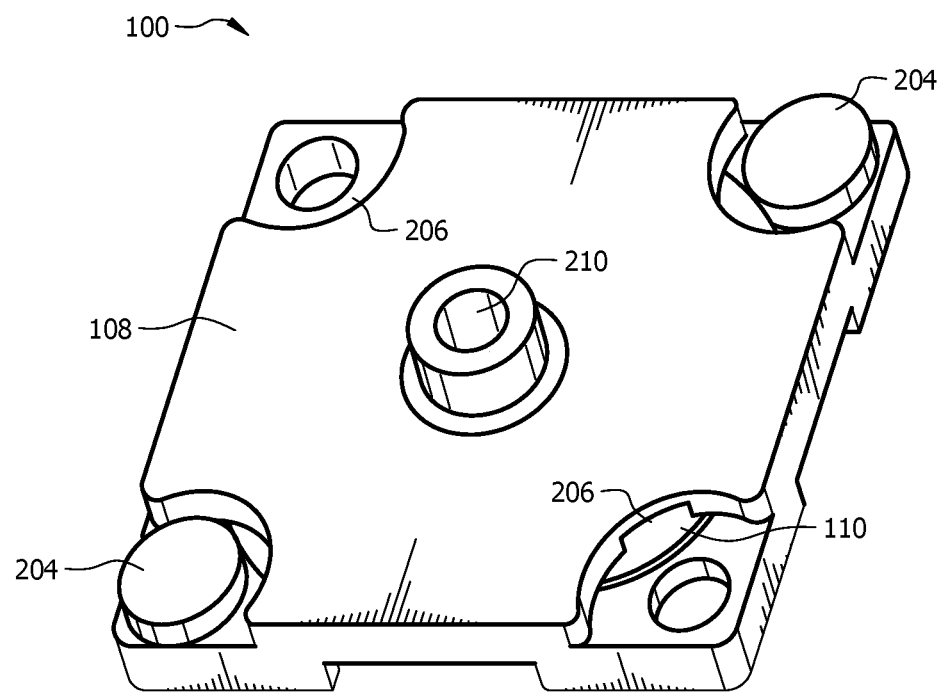
FIG. 2A is a top perspective view of a fully assembled micro airflow generator, according to an embodiment of the disclosure.
Figure 2B:
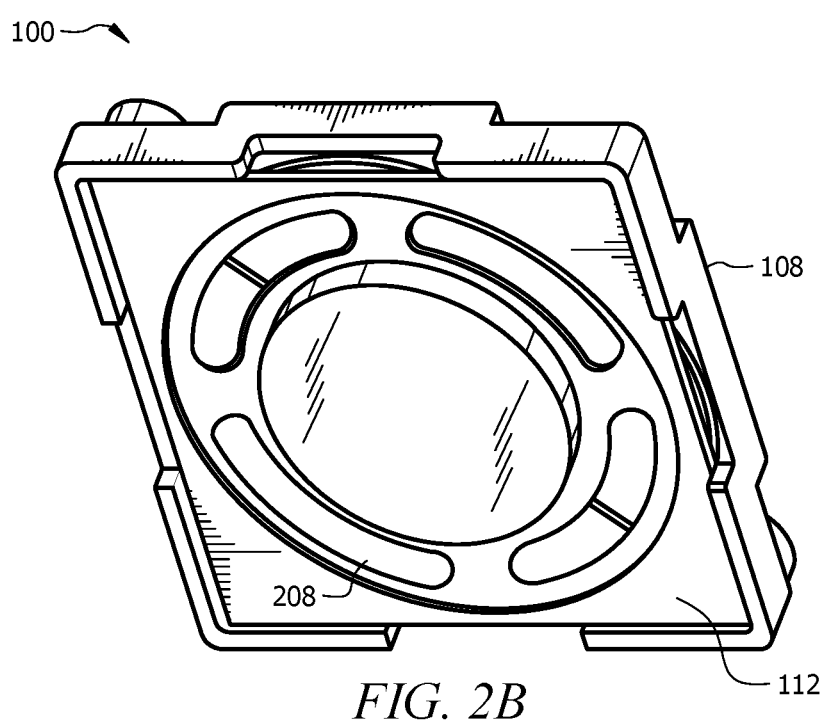
FIG. 2B is a bottom perspective view of a fully assembled micro airflow generator, according to an embodiment of the disclosure.

FIGS. 2A-2E shows various views of the fully assembled micro airflow generator 100 with an electro-magnetic actuator 102 as shown in FIG. 1. FIG. 2A shows the top side (or housing 108) of the micro airflow generator 100, and FIG. 2B shows the back side (or cover plate 112) of the micro airflow generator 100. In FIG. 2A, the airflow generator 100 comprises one or more electric terminals 204 (shown on one or more corners of the housing 108), which may provide power and/or operate/drive the electro-magnetic actuator 102. Air intake can occur through one or more air inlet(s) 206 (e.g. typically located on one or more corners of the housing, for example on the corners not having electric terminals 204) and/or from an air inlet 208 of the cover plate 112. Air may be expelled from the airflow generator 100 of FIG. 2A through air outlet 210. So for example, in operation air might be drawn into the housing 108 via inlet(s) (e.g. 208 and/or 206), for example by movement/vibration/pulsation of the membrane of the electro-magnetic actuator 102 creating a vacuum as air is expelled out through the outlet 210. Once air is drawn into the housing 108, the movement of the membrane may drive air out of the housing 108 through the outlet 210. When such a micro airflow generator 100 is used in a compact optical PM sensor, the outlet 210 would typically be located so that it would be configured to provide a sample airstream for testing via optical scattering particle detection (e.g. so the air stream from the outlet 210 interacts with an optical scattering detection unit, e.g. passing between a light source and a light detector).

Figure 2C:
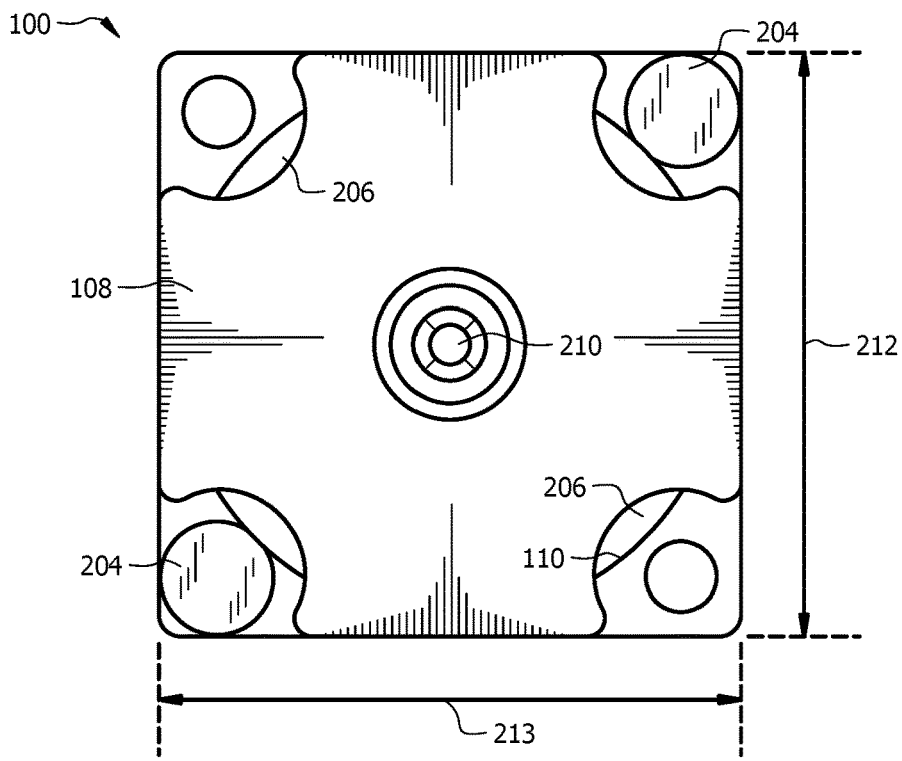
FIG. 2C is a top down view of a fully assembled micro airflow generator, according to an embodiment of the disclosure.
Figure 2D:
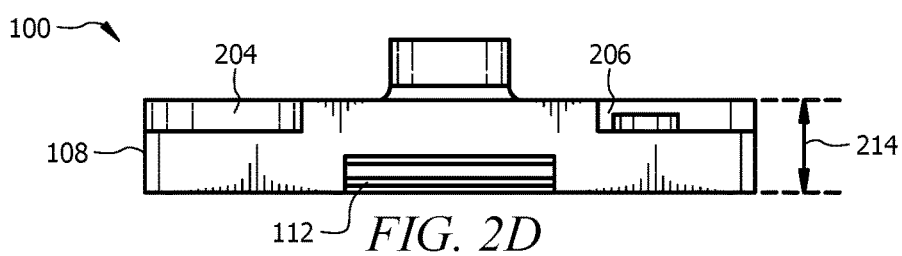
FIG. 2D is a side view of a fully assembled micro airflow generator, according to an embodiment of the disclosure.

FIGS. 2C and 2D show the dimensions of airflow generator 100 in an embodiment. In FIG. 2C, each side 212 and 213 of the airflow generator 100 measures approximately 10 mm. In FIG. 2D, the height or thickness 214 of airflow generator 100 measures approximately 2.5 mm. Typically, the footprint for the airflow generator 100 might be 100 mm$^2$ or less (for example, 75-100 mm$^2$, 85-100 mm$^2$, or 75-85 mm$^2$) and/or the three-dimensional (volume) size would be 250 mm$^3$ or less (for example, 100-250 mm$^3$ or 150-250 mm$^3$ or 100-150 mm$^3$).

Figure 2E:
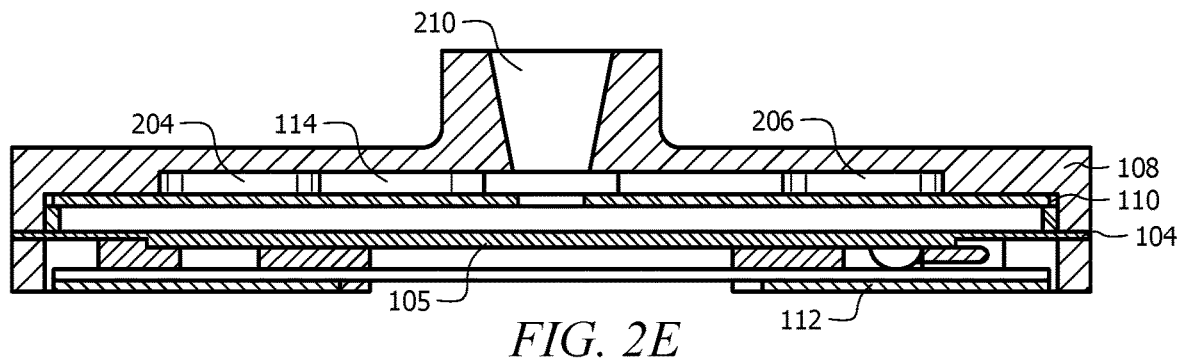
FIG. 2E is a cross-sectional view of a micro airflow generator, according to an embodiment of the disclosure.

FIG. 2E shows a cross-section view of the micro airflow generator 100 of FIG. 1. In this view, the shape of the outlet 210 in this embodiment as a diffusion channel (e.g. wider at the distal end/location than at the proximal end/location with respect to the membrane) may be seen, along with the relative location of the valvular conduit 114 with respect to the electro-magnetic actuator/membrane 104, the aperture in the pump plate 110, and the outlet 210. The outlet 210 typically has a proximal opening of approximately 0.4 mm$^2$ and a distal opening of approximately 1 mm$^2$ in FIG. 2E, and typically might have a length of approximately 1.2 mm between the proximal and distal openings. So, movement of the membrane 104 of the electro-magnetic actuator (e.g. in response to electrical signals from the electric terminals 204) draws air in from the inlet(s) 206, through the Tesla valvular conduit 114, and out the outlet 210. Also, a Venturi neck may be used to provide low pressure to help pull in inlet air flow. Such a configuration for the airflow generator may direct air effectively without moving parts (thereby increasing reliability). For example, the diffusion channel (at the outlet 210) may reduce pressure to help flow outward through the outlet, while the Tesla valvular conduit 114 may provide high friction to reduce flow back to the inlet(s) (such that air driven by the membrane motion may be channeled outward through the outlet without significant loss back towards the inlet(s) even without a moving-part valve).

Figure 3:
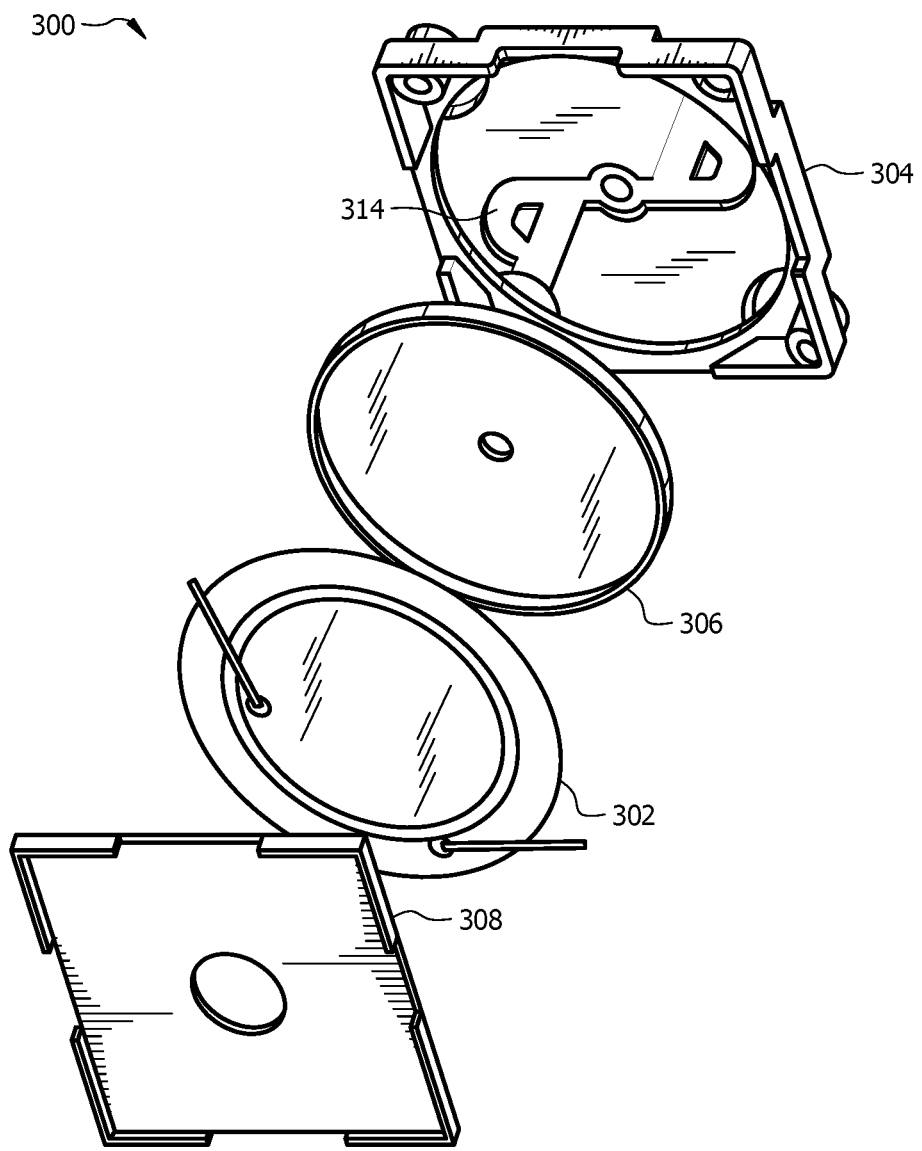
FIG. 3 illustrates an exploded view of another exemplary micro airflow generator, comprising a piezo disc bender, according to an embodiment of the disclosure.

FIG. 3 is an exploded view of an exemplary micro airflow generator 300 using a piezo disc bender actuator 302. The piezo disc bender actuator 302 can be constructed from piezo buzzer disc bender parts or similar material. The piezo disc bender actuator 302 of FIG. 3 is typically enclosed in pump housing 304 between pump plate 306 and cover plate 308 (similar to the discussion above). The pump housing 304 may comprise Tesla valvular conduit 314 in fluid communication with the inlet(s) and the outlet (and typically the aperture in the pump plate 306).

Figure 4A:
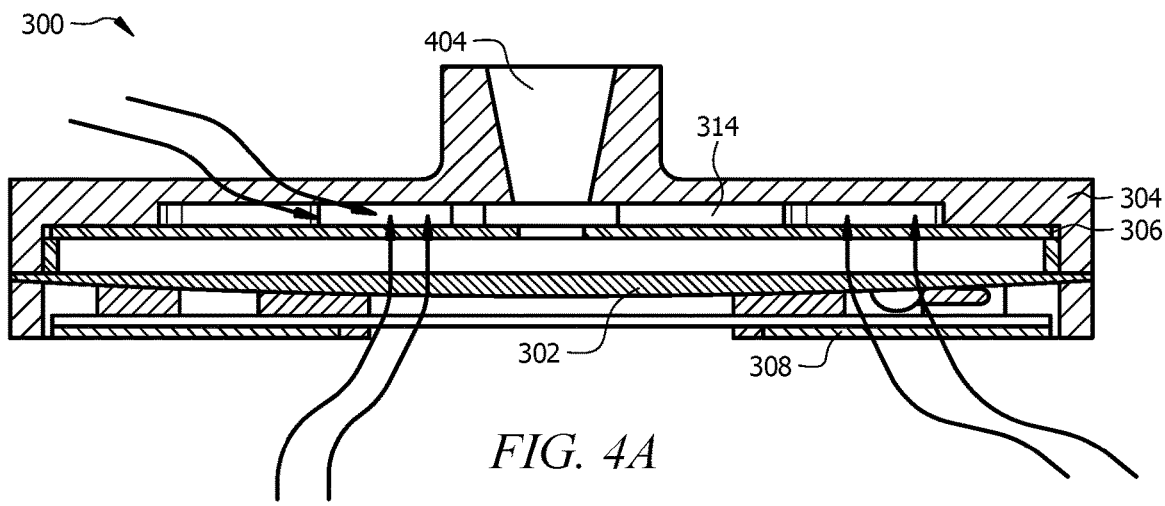
FIG. 4A is a cross-sectional view of a micro airflow generator illustrating air intake, according to an embodiment of the disclosure.
Figure 4B:
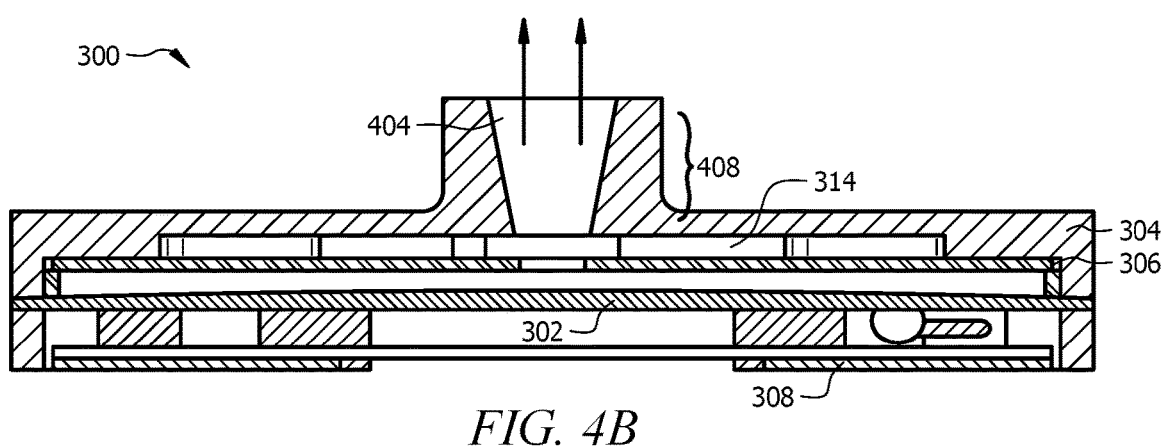
FIG. 4B is another cross-sectional view of a micro airflow generator illustrating air output, according to an embodiment of the disclosure.

FIGS. 4A-4B show cross section views of the micro airflow generator 300 of FIG. 3 using a piezo disc bender actuator 302 in operation. The arrows in each view are generally indicative of the direction of air flow through the airflow generator. In FIG. 4A, air is flowing into the airflow generator 300 (e.g. through the inlets and the Tesla valvular conduit 314 and down through the aperture in the pump plate 306 towards the membrane 302) as the piezo disc bender actuator 302 can be seen bending/flexing downward. In FIG. 4B, the air is flowing out of the pump 300 and out of the outlet/diffusion channel 404. The piezo disc bender actuator 302 can be seen bending upward (since it is the movement of the piezo disc bender that drives the air flow upward from the piezo disc towards and through the outlet with diffusion channel). In FIG. 4B, diffusion channel 404 contains a Venturi 408 at the neck (in other words, a narrowing of the width that creates low pressure to pull in the inlet flow). Also, the high friction of the valvular conduit 314 may assist to reduce flow leak to the inlet, thereby directing the air flow out the diffusion channel 404.

Figure 5A:
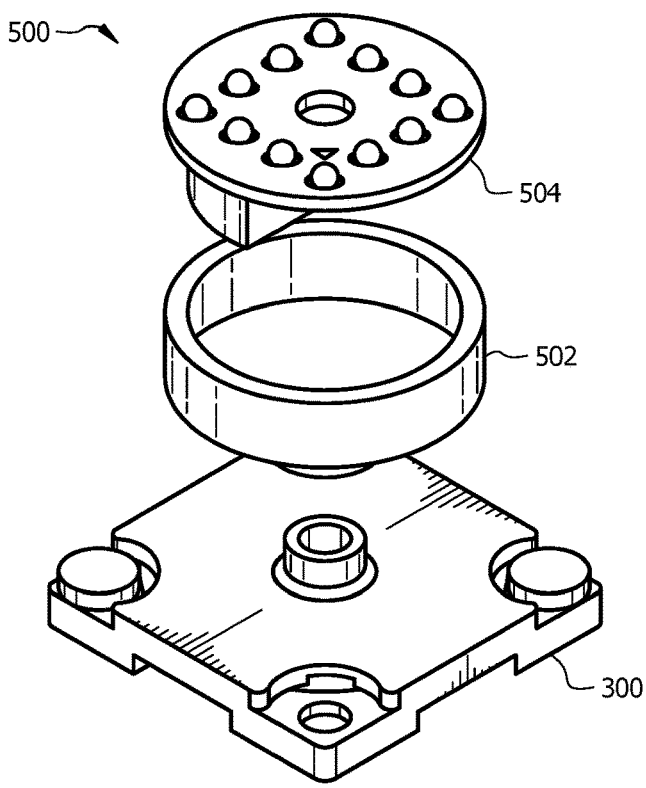
FIG. 5A illustrates a top down exploded view of an exemplary compact optical PM sensor comprising an exemplary micro airflow generator, according to an embodiment of the disclosure.
Figure 5B:
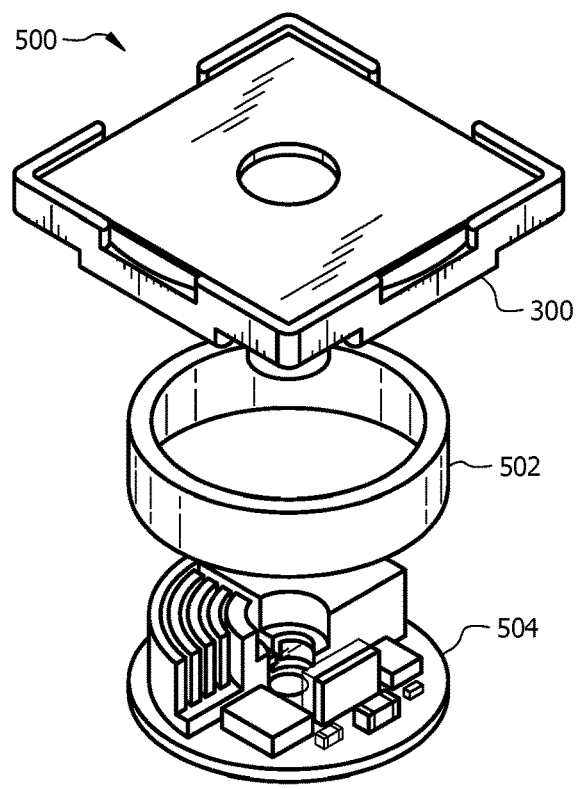
FIG. 5B illustrates a bottom up exploded view of an exemplary compact optical PM sensor comprising an exemplary micro airflow generator, according to an embodiment of the disclosure.
Figure 5C:
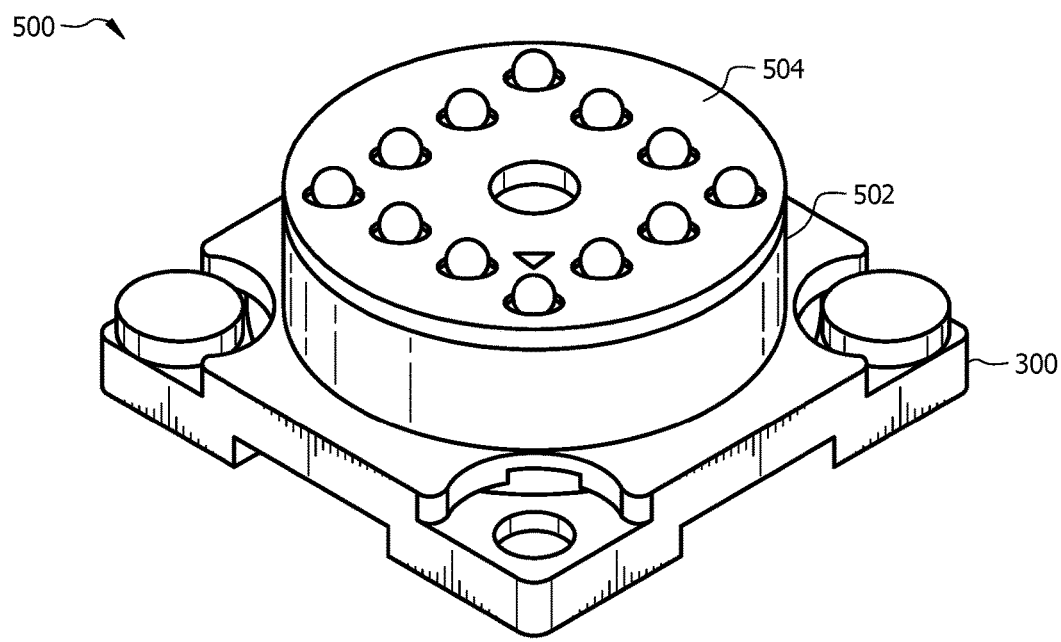
FIG. 5C is a fully assembled view of a compact optical PM sensor, according to an embodiment of the disclosure.
Figure 5D:
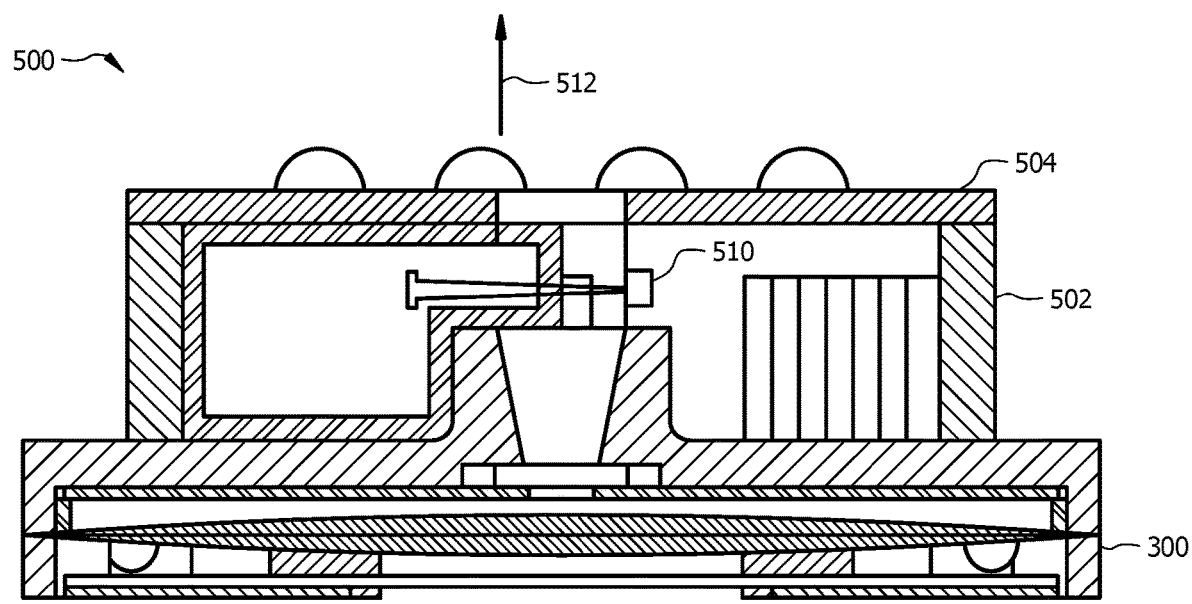
FIG. 5D is a cross-sectional view of a compact optical PM sensor, according to an embodiment of the disclosure.

FIGS. 5A-5D illustrate various views of an exemplary micro airflow generator 300 as used in a compact optical PM sensor 500. FIG. 5A shows a top down exploded view and FIG. 5B shows a bottom up exploded view of an exemplary compact optical PM sensor 500 comprising an exemplary micro airflow generator 300. The compact optical PM sensor 500 may comprise a micro airflow generator 300; a sensor cover 502; and an optical scattering particle detection module (which may also comprise a compact PM sensor board assembly) 504. FIG. 5C shows an assembled view of such a compact optical PM sensor 500. In FIG. 5D, a cross section view of the compact optical PM sensor 500 can be seen with the laser source 510 identified (e.g. a laser diode die). The apertures/openings/holes (e.g. airflow openings) of the various elements are typically aligned, for example along a central axis of the device. Typically, the air would travel in direction 512 through the compact optical PM sensor 500.

Figure 6A:
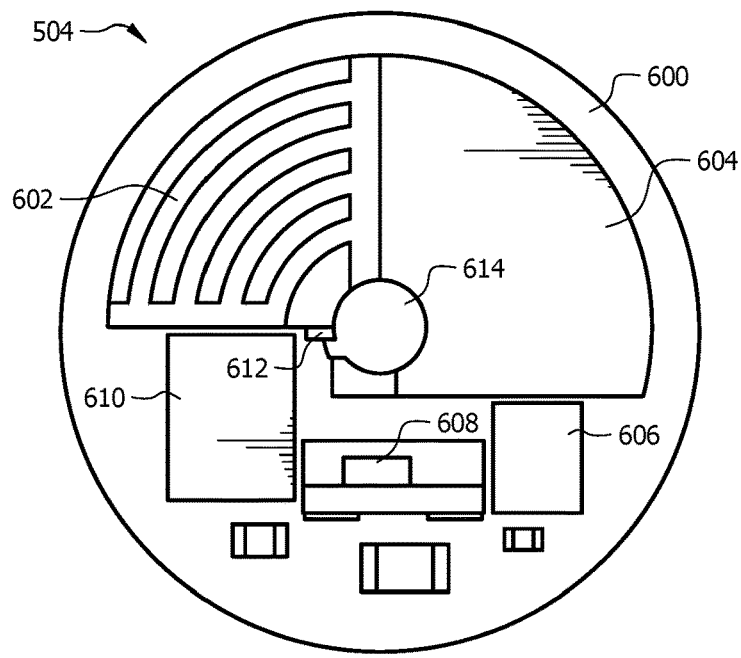
FIG. 6A is a top down view of a compact optical PM sensor board assembly, illustrating laser scattering particle detection, according to an embodiment of the disclosure.
Figure 6B:
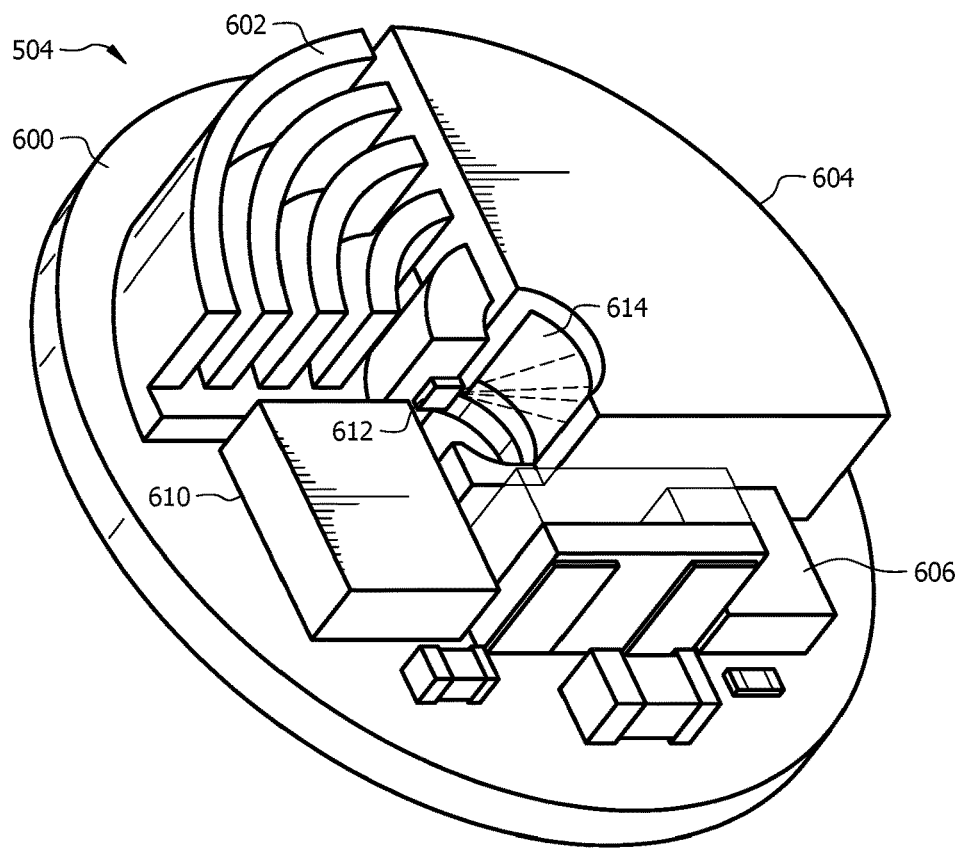
FIG. 6B is a three-dimensional perspective view of a compact optical PM sensor board assembly, according to an embodiment of the disclosure.

Turning now to FIGS. 6A-6B, these figures illustrate an exemplary optical scattering particle detection module (which may also comprise a compact PM sensor board assembly) 504 shown in FIG. 5A. In FIG. 6A, the particle detection module 504 may comprise a printed circuit board 600; a laser diode die 612; a photodiode 608; a laser heatsink 602; a laser beam trap 604; a low noise preamplifier 606; an output beam hole 614; and/or a processor 610. FIG. 6B shows a perspective three-dimensional view of particle detection module 504 seen in FIG. 6A. The light source contained in the particle detection module 504 would typically be greatly simplified from existing PM sensors. For example, the laser diode die 612 may have a very small laser beam size (e.g. 2 µm at nominal wavelength 650 nm). Disclosed embodiments of the laser diode die 612 are typically sized to be approximately 0.3 mm in length, 0.25 mm in width, 0.1 mm in height. The footprint of the laser diode die 612 might be 0.075 mm$^2$ or less and/or the three-dimensional (volume) size would be 0.0075 mm$^3$ or less. The laser diode die 612 typically has no associated optical component, such as an optical window or focusing optics, which are bulky and take up much space on the sensor board. Thus, the beam from the laser diode die 612 may be used without optically reshaping the beam profile.

For example, in operation, the laser diode die 612 would emit a well-defined output beam profile (e.g. with fixed beam divergence) at the near field close to the laser diode die 612 output area. The output beam or hole 614 (of laser diode die 612) is emitted in a cross path to the path of airflow. In other words, the air flows in the direction through the particle detection module 504 (which has an opening/hole/aperture therethrough, for example centrally located and configured to receive the air output stream from the micro airflow generator). For example, the air flows through hole 614 in the center of the particle detection module 504, passes through the wide output beam seen in FIG. 6A inside hole 614, and exits the particle detection module 504 (as if perpendicular to the page). Particles can be scattered in any direction as they pass through the wide output beam. Any particles that are scattered and deflected in the direction toward the photodiode 608 will be detected and measured by the photodiode 608 (which may be oriented perpendicular to the beam). Any particles that are scattered in any other direction should be captured by the laser beam trap 604. The laser beam trap 604 may also be configured to dump the laser beam to minimize stray light into the detection area. The laser heatsink 602 is typically configured to provide thermal management for the laser diode die 612.

In some embodiments, the photodiode 608 is a silicon PIN photodiode with dimensions of approximately 2 mm in length, 1.25 mm in width, and 0.85 mm in height. The footprint of the photodiode 608 might be 2.5 mm$^2$ or less and/or the three-dimensional (volume) size would be 2.125 mm$^3$ or less. Similar to the laser diode die 612, the photodiode 608 would be used without any collecting or other optics. In an embodiment, the distance between the output beam 614 and the photodiode 608 is a short/close distance of approximately 1.5 mm. Such a short (close) distance over which the photodiode can collect and detect particulate matter for analysis enables the miniature laser and photodiode to function accurately and reliably as a PM sensor (for example, even without optics). The short distance permits the photodiode 608 to operate highly efficiently at collecting and detecting PM that is scattered by the output beam.

In some embodiments, the processor 610 and/or circuitry may include a driver for the laser diode die 612, and a signal processor to analyze the scattered particle signal that is collected and detected by the photodiode 608. The processor and/or circuitry may also comprise low noise preamplifier for the photodiode.

Having described various devices and methods herein, exemplary embodiments or aspects can include, but are not limited to:

In a first embodiment, a micro airflow generator may comprise a pump housing; a diffusion channel incorporated into the pump housing; a valvular conduit incorporated into the pump housing and in fluid communication with the diffusion channel; a pump plate configured to fit within the pump housing, and comprising an aperture in fluid communication with the valvular conduit; an actuator positioned adjacent to the pump plate within the pump housing; and a steel cover plate configured to attach to the pump housing and contain the elements within the pump housing.

A second embodiment can include the micro airflow generator of the first embodiment, wherein the actuator is an electro-magnetic actuator.

A third embodiment can include the micro airflow generator of the second embodiment, wherein the electro-magnetic actuator comprises a magnet and a membrane with a coil.

A fourth embodiment can include the micro airflow generator of any of the first through third embodiments, wherein the actuator is a piezo disc bender.

A fifth embodiment can include the micro airflow generator of any of the first through fourth embodiments, wherein the actuator is configured to generate airflow into the housing and out of the housing via one or more air inlets and one or more air outlets of the micro airflow generator.

A sixth embodiment can include the micro airflow generator of the fifth embodiment, wherein the air inlets and air outlets comprise dynamic check valves.

A seventh embodiment can include the micro airflow generator of any of the first through sixth embodiments, wherein the diffusion channel has a Venturi shape.

An eighth embodiment can include the micro airflow generator of any of the first through seventh embodiments, wherein the diameter of the fully assembled pump is approximately 10 mm.

A ninth embodiment can include the micro airflow generator of any of the first through eighth embodiments, wherein the height of the fully assembled pump is approximately 2.5 mm.

A tenth embodiment can include the micro airflow generator of any of the first through ninth embodiments, further comprising a membrane, wherein the actuator drives the membrane, which is configured to generate airflow out an outlet in the pump housing.

In an eleventh embodiment, a method for generating airflow via a micro airflow generator within a compact optical scattering particulate matter sensor may comprise providing a micro airflow generator comprising a housing having at least one inlet and at least one outlet; a membrane configured so that movement of the membrane drives air through the outlet; and an actuator configured to drive membrane movement; generating airflow out of the housing via the actuator; directing the airflow into an optical scattering particle detection module; and detecting, by the optical scattering particle detection module, particulate matter within the airflow.

A twelfth embodiment can include the method of the eleventh embodiment, wherein directing the airflow into an optical scattering particle detection module comprising passing the airflow between a light source and a light detector.

A thirteenth embodiment can include the method of the eleventh or twelfth embodiments, further comprising producing a laser beam by a laser diode die of the optical scattering particle detection module; and detecting, by a photodiode, light that is scattered by particulate matter passing through the laser beam.

A fourteenth embodiment can include the method of any of the eleventh through thirteenth embodiments, further comprising applying a force to the actuator, causing movement of the membrane.

A fifteenth embodiment can include the method of any of the eleventh through fourteenth embodiments, further comprising directing the airflow through a valvular conduit of the housing before is air passes through the outlet of the housing.

In a sixteenth embodiment, a compact optical scattering particulate matter sensor comprising a micro airflow generator comprising a housing having an inlet and an outlet; a membrane configured so that movement of the membrane drives air through the outlet; and an actuator configured to drive membrane movement; and an optical scattering particle detection module, wherein the outlet of the micro airflow generator is configured to direct airflow for interaction with the optical scattering particle detection module.

A seventeenth embodiment can include the compact optical scattering particulate matter sensor of the sixteenth embodiment, wherein the compact sensor is sized 500 $mm^3$ or less.

An eighteenth embodiment can include the compact optical scattering particulate matter sensor of the sixteenth or seventeenth embodiments, wherein the micro airflow generator has a footprint of 100 $mm^2$ or less.

A nineteenth embodiment can include the compact optical scattering particulate matter sensor of any of the sixteenth through eighteenth embodiments, wherein the micro airflow generator has a volume of 250 $mm^3$ or less.

A twentieth embodiment can include the compact optical scattering particulate matter sensor of any of the sixteenth through nineteenth embodiments, wherein the optical scattering particle detection module is configured to detect particulate matter within the airflow generated by the airflow generator.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow that scope including all equivalents of the subject matter of the claims. Each and every claim is incorporated as further disclosure into the specification and the claims are embodiment(s) of the present invention(s).

Furthermore, any advantages and features described above may relate to specific embodiments, but shall not limit the application of such issued claims to processes and structures accomplishing any or all of the above advantages or having any or all of the above features.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure. Specifically, and by way of example, although the headings might refer to a "Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a limiting characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of the claims shall be considered on their own merits in light of this disclosure, but should not be constrained by the headings set forth herein.

Use of broader terms such as "comprises," "includes," and "having" should be understood to provide support for narrower terms such as "consisting of," "consisting essentially of," and "comprised substantially of." Use of the terms "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A micro airflow generator comprising:
   a pump housing having an outlet, an inner surface, and an opposing outer surface;
   a diffusion channel;
   a valvular conduit disposed on the inner surface of the pump housing, the valvular conduit in fluid communication with the diffusion channel;
   a pump plate configured to fit within the pump housing, and comprising an aperture in fluid communication with the valvular conduit, the aperture axially aligned with a longitudinal axis of the outlet of the pump housing;
   an actuator positioned adjacent to the pump plate within the pump housing; and
   a steel cover plate configured to attach to the pump housing, wherein the steel cover plate, in conjunction with the pump housing contain the diffusion channel, the valvular conduit, the pump plate, and the actuator within the pump housing.

2. The micro airflow generator of claim 1, wherein the actuator is an electro-magnetic actuator.

3. The micro airflow generator of claim 2, wherein the electro-magnetic actuator comprises a magnet and a membrane with a coil.

4. The micro airflow generator of claim 1, wherein the actuator is a piezo disc bender.

5. The micro airflow generator of claim 1, wherein the actuator is configured to generate airflow into the housing and out of the housing via one or more air inlets and one or more air outlets of the micro airflow generator.

6. The micro airflow generator of claim 5, wherein the air inlets and air outlets comprise dynamic check valves.

7. The micro airflow generator of claim 1, wherein the diffusion channel has a Venturi shape.

8. The micro airflow generator of claim 1, wherein a diameter of a fully assembled micro airflow generator is approximately 10 mm.

9. The micro airflow generator of claim 1, wherein a height of a fully assembled micro airflow generator is approximately 2.5 mm.

10. The micro airflow generator of claim 1, further comprising a membrane, wherein the actuator drives the membrane, which is configured to generate airflow out the outlet in the pump housing.

* * * * *